United States Patent
Lin

(10) Patent No.: US 6,753,903 B1
(45) Date of Patent: Jun. 22, 2004

(54) ADAPTOR FOR DIRECT CONNECTION BETWEEN USB DIGITAL STILL CAMERA AND USE COLOR PRINTER

(75) Inventor: Chun-Ping Lin, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/392,983

(22) Filed: Sep. 9, 1999

(30) Foreign Application Priority Data

Oct. 26, 1998 (TW) ........................................ 87117697 A

(51) Int. Cl.[7] ............................................. H04N 5/225
(52) U.S. Cl. ................................................. 348/207.2
(58) Field of Search .......................... 348/207.2, 207.1; 710/313, 110, 119, 242

(56) References Cited

U.S. PATENT DOCUMENTS

| | | | | |
|---|---|---|---|---|
| 5,602,780 A | * | 2/1997 | Diem et al. | 365/189.01 |
| 5,784,581 A | * | 7/1998 | Hannah | 710/110 |
| 5,933,247 A | * | 8/1999 | Shibata | 358/404 |
| 5,938,735 A | * | 8/1999 | Malik | 709/238 |
| 6,067,595 A | * | 5/2000 | Lindenstruth | 710/307 |
| 6,151,410 A | * | 11/2000 | Kuwata et al. | 382/167 |
| 6,256,687 B1 | * | 7/2001 | Ellis et al. | 710/71 |
| 6,577,337 B1 | * | 6/2003 | Kang | 348/207.1 |
| 6,693,665 B1 | * | 2/2004 | Shindo et al. | 348/207.2 |

FOREIGN PATENT DOCUMENTS

JP         10200919 A    *  7/1998   ............ H04N/9/79

OTHER PUBLICATIONS

Polaroid Corporation, "Polaroid Direct Connect Adapter User Guide", Sep. 1998.*

* cited by examiner

Primary Examiner—Wendy R. Garber
Assistant Examiner—Jason Whipkey
(74) Attorney, Agent, or Firm—Beyer Weaver & Thomas, LLP

(57) ABSTRACT

An adaptor for connecting between a digital still camera and a printer. The adaptor comprises a transfer controller, a memory, and a multi-processing micro-controller. The transfer controller is connected to a data bank. The transfer controller receives and stores image data from the digital still camera into the data bank, then transferring the image data to the printer. The memory has a system program stored therein. The multi-processing micro-controller is connected to the transfer controller and the memory through a data bus and a control bus. The multi-processing micro-controller controls the transfer controller in receiving and transferring the image data concurrently in response to the system program.

14 Claims, 2 Drawing Sheets

ADAPTOR FOR DIRECT CONNECTION BETWEEN USB DIGITAL STILL CAMERA AND USE COLOR PRINTER

BACKGROUND OF THE INVENTION

1. Field of the Invention

The present invention relates to an applied USB (Universal Serial Bus) interfacing technology. More specifically, the present invention relates to an adaptor used to process and transmit image data directly from a USB-based digital still camera to a USB-based color printer.

2. Description of Related Art

Traditional serial bus connections like RS-232C have at least three shortcomings: transmission speed is slow, use is complicated, and connection is limited to only a few ports. Ever since the introduction of the Universal Serial Bus (referred to as "USB" hereafter) in 1996, USB has been gladly received as the newly established standard for the next generation serial bus connections with new functionality like Plug-And-Play, 12 Mbits/sec high speed transmission, support of up to 127 peripheral devices, fault-proof connector design, and low cost, etc. At present, there has been a number of computer peripheral devices supporting the USB standard on the market, such as monitors, keyboards, mice, joysticks, scanners, printers, digital cameras, etc.

Conventionally, when a high quality digital image is taken by a digital still camera (referred to as "DSC" hereafter), the image data is first processed through a personal computer with an operating system (e.g., Microsoft Windows 98) using USB host software like USB client driver, USB driver (USBD), or a USB host controller driver (HCD), and then sent to a color printer for printing. In other words, the personal computer is a required interfacing adaptor between a DSC and a printer when a DSC needs to print out the pictures it has taken. However, if a person has to travel without taking a computer with him or her, then this person will not be able to get a hard copy of the digital images that have been taken.

SUMMARY OF THE INVENTION

Accordingly, it is the object of the present invention to provide an apparatus for converting image data outputted from a DSC into a usable data format for a color printer or a photo printer. All that is required is that both the DSC and the color printer are USB-based. These digitized images are to be edited in a DSC before sending directly to an available USB color printer for printout.

It is another object of the present invention to provide an adaptor for a USB-DSC to output its image data directly to a USB color printer. All is required is that the color printer is USB-based. The adaptor is capable of accepting and processing the digitized image files saved in the flash memory card of the DSC, and then transmitting them directly to a USB color printer for printouts.

In order to achieve the described objects, the present invention provides an adaptor for connecting between a digital still camera and a printer, comprising a transfer controller, a memory, and a multi-processing micro-controller. The transfer controller is connected to a data bank. The transfer controller receives and stores image data from the digital still camera into the data bank, then transfers the image data to the printer. The memory has a system program stored therein. The multi-processing micro-controller is connected to the transfer controller and the memory through a data bus and a control bus. The multi-processing micro-controller controls the transfer controller in receiving and transferring the image data concurrently in response to the system program.

Since the interfacing adaptor of the present invention is capable of being a data-converting interface between two USB peripherals, it is only required that the DSC and printer are both USB-based to have a direct data transmission from a DSC to a printer after image data are edited and selected in the DSC.

Furthermore, the present invention can provide a slot for removable memory cards. Therefore, other image data stored in the memory card can be transferred to the data bank and then processed by the transfer controller to the printer for printout. Thus, it is only required that the printer be USB-based to have the printer print out directly what is stored in the DSC memory card.

BRIEF DESCRIPTION OF THE DRAWINGS

Other objects, features, and advantages of the present invention will become apparent from the following detailed description of the preferred but non-limiting embodiment. The description is made with reference to the accompanying drawings in which.

DETAILED DESCRIPTION OF THE PREFERRED EMBODIMENT

According to the present invention, an adaptor for a direct USB (Universal Serial Bus) data transmission between a USB digital still camera and a USB color printer can indeed be a money-saving alternative to a PC (Personal Computer). The image data collected in the DSC (Digital Still Camera) are selected and edited on the DSC's software/hardware platform and then sent directly to an available printer for printout, skipping the conventional PC connection using the USB host driver of the operating system (e.g., Windows 98).

Figure 1:
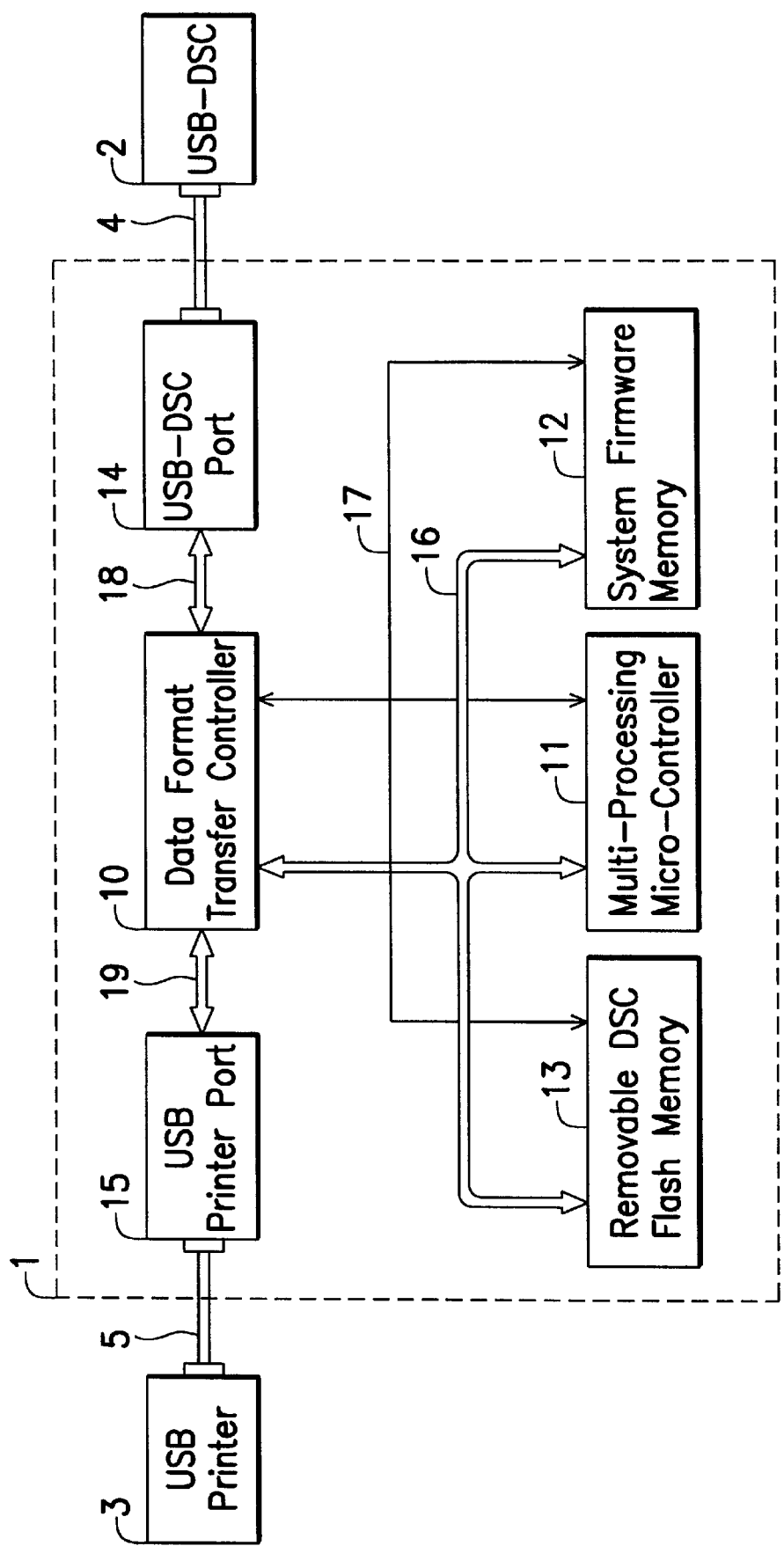
FIG. 1 is a block diagram depicting the flow of data from DSC to color printer according to one preferred embodiment of the present invention.

Referring to FIG. 1, a block diagram for the preferred embodiment of the DSC to printer adaptor is schematically illustrated. FIG. 1 illustrates an adaptor comprising data format transfer controller 10, a multi-processing micro-controller 11, a system firmware memory 12, a USB-DSC port 14, and a USB printer port 15.

As shown in FIG. 1, a USB-DSC port 14 of the adaptor 1 is connected with the USB-DSC 2; the coupling between the USB-DSC port 14 and the USB-DSC 2 is a USB cable 4. Since the adaptor 1 is functioning as a host under the USB platform, the connector of the USB cable 4 adjoining the USB-DSC port 14 is a Type-A connector, and the connector of the USB cable 4 adjoining the USB-DSC 2 is a Type-B connector. Similarly, a USB printer port 15 of the adaptor 1 is in connection with the USB printer 3; the coupling between USB printer port 15 and USB printer 3 is a USB cable 5. Since the adaptor 1 is functioning as a host under the USB platform, the connector of the USB cable 5 adjoining the USB printer port 15 is a Type-A connector, and the connector of the USB cable 5 adjoining the USB printer 3 is a Type-B connector.

In short, the aforementioned USB-DSC port 14 and USB printer port 15 is an interfacing circuit including a pull-up device, a pull-down device, and some registers. Furthermore, the USB-DSC port 14 and the USB printer port 15 transmit data or control signals via buses 18 and 19, with the format transfer controller 10, respectively.

In FIG. 1, the multi-processing micro-controller 11, which is connected with the data format transfer controller 10 and the system firmware memory 12 via a data bus 16 and a control bus 17, is the central processing unit of the present invention. The multi-processing micro-controller 11 performs the system initiation operation by following the system initialization program stored in the system firmware memory 12. In addition, the multi-processing micro-controller 11 performs the USB enumeration and configuration procedure, and controls the overall system functioning of the adaptor 1 by following the system firmware program stored in the system firmware memory 12. In order to reduce the number of instruction cycles under the multi-processing environment, the multi-processing micro-controller 11 is preferably a RISC-based microprocessor.

Moreover, the adaptor 1 of the present invention can work with non-USB compliant DSC's by optionally installing a slot for a removable DSC flash memory card 13. Accordingly, the flash memory card 13 need only be removed from the non-USB based DSC's and connected with the data bus 16 and the control bus 17 of the adaptor 1 to unload recorded image data to a USB color printer 3 for printout.

Figure 2:
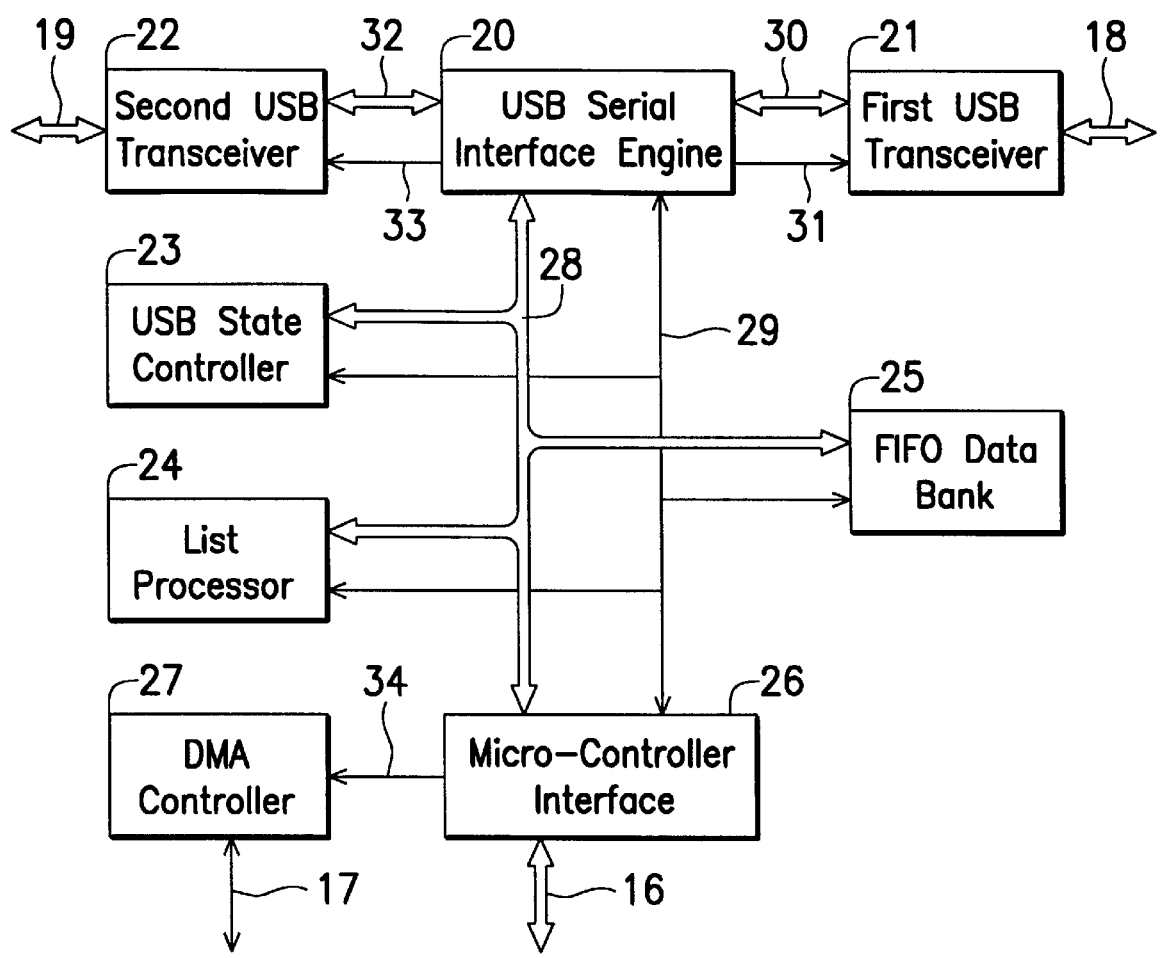
FIG. 2 is a detailed block diagram of the data format transfer controller as shown in FIG. 1.

Referring to FIG. 2, the detailed block diagram illustrates the data format transfer controller 10 shown in FIG. 1. As shown in FIG. 2, the data format transfer controller 10 comprises a USB serial interface engine 20, a first USB transceiver 21, a second USB transceiver 22, a USB state controller 23, a list processor 24, a FIFO data bank 25, a micro-controller interface 26, and a DMA controller 27.

In FIG. 2, the USB serial interface engine 20, the USB state controller 23, the list processor 24, FIFO data bank 25, and the micro-controller interface 26 are inter-connected via a data bus 28 and a control bus 29. The first USB transceiver 21 connects the USB-DSC port 14 via bus 18, and it concurrently connects to the USB serial interface engine 20 via a data bus 30 and a control bus 31. The second USB transceiver 22 connects the USB printer port 15 via bus 19 while it concurrently connects to the USB serial interface engine 20 via a data bus 32 and a control bus 33.

The first USB transceiver 21 and the second USB transceiver 22 can be both high-speed transceivers rated at a data transfer speed of 12 Mbit/sec; their main task is to transmit and receive processed data to the USB color printer 3 and unprocessed data from the USB-DSC 2 concurrently based on the differential manner. The USB serial interface engine 20 receives and transmits data that the first USB transceiver 21 and the second USB transceiver 22 need for decoding/encoding, respectively, based on the "non-return zero inverted" (NZRI) method. After performing a cyclic redundancy check (CRC) operation, the USB serial interface engine 20 then converts image data received from serial mode to parallel mode or converts the data to be transmitted from parallel mode to serial mode.

The USB state controller 23 checks and controls the USB bus protocol of the data flowing in and out of the USB serial interface engine 20 by executing system firmware program written in the system firmware memory. Furthermore, The USB state controller 23 is responsible for generating a token signal every millisecond for synchronization, which is a start of frame (SOF) signal for the USB bus. The synchronization of DSC 2, color printer 3, and adaptor 1 of the present invention is made possible by this SOF signal. Finally, the USB state controller 23 initiates or triggers the task processing list queued in the list processor 24.

The list processor 24 executes, in order, the task processing list generated through the system firmware program of the adaptor 1 of the present invention.

The micro-controller interface 26 connects the multi-processing micro-controller 11 via the data bus 16, and it controls DMA controller 27 via the control bus 34. The DMA controller 27 is also in connection with the control bus 17. When the adaptor 1 of the present invention is ready to read image data saved in the flash memory card 13, it can access the data promptly through DMA controller. Without having to go through the interrupt service request of the multi-processing micro-controller, the speed to access the flash memory card 13 can be increased while minimizing the burden of the multi-processing micro-controller 11.

Figure 3:
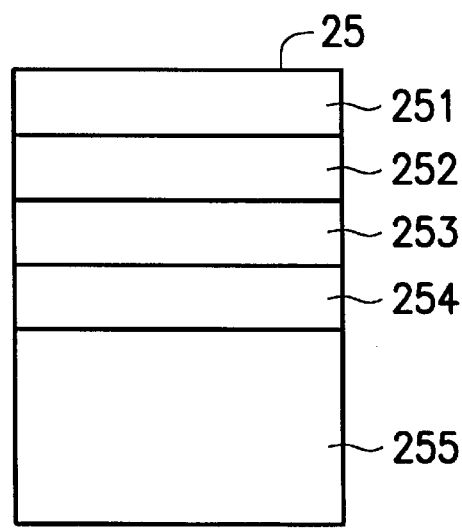
FIG. 3 is a schematic diagram illustrating the structure of the FIFO data bank as shown in FIG. 2.

As described above, control messages, received digitized image data, or digitized image data to be transmitted will all be stored temporarily in the FIFO data bank 25. Referring to FIG. 3 of the drawing, which is a schematic diagram illustrating the structure of the FIFO data bank shown in FIG. 2, the FIFO data bank 25 is divided into three different subgroup types: two bi-directional 8-byte control transfer FIFO banks 251 and 252, two Uni-directional 8-byte interrupt transfer FIFO banks 253 and 254, and a bi-directional 64-byte Bulk_IN/Bulk_OUT data transfer FIFO bank 255. Among these subgroups of FIFO data banks, bi-directional 8-byte control transfer FIFO bank 251 and Uni-directional 8-byte interrupt transfer FIFO bank 253 are assigned to work with DSC 2 while bi-directional 8-byte control transfer FIFO bank 252 and Uni-directional 8-byte interrupt transfer FIFO bank 254 are assigned to work with color printer 3. Preferably, the FIFO data bank 25 can be implemented by a dual port memory.

The following describes the overall operating procedure for the adaptor 1 of the present invention.

When the system is turned on or started up, the multi-processing micro-controller 11 reads and executes system initialization program stored in the system firmware memory 12 in order to conduct a system initializing operation. After the system is started, or booted, the "Plug & Play" procedure will take over in order to install DSC 2 and color printer 3 to adaptor 1. Moreover, the multi-processing micro-controller 11 will proceed to execute a USB enumeration & configuration procedure to DSC 2 and color printer 3. The configuration data/message demanded by the USB enumeration & configuration procedure will be temporarily stored in the bi-directional 8-byte control transfer FIFO banks 251 and 252 assigned for DSC 2 and color printer 3, respectively. Since the steps and program sequence in the USB enumeration & configuration procedure are entirely according to the USB Specification Version 1.0, they will not be repeated here.

After the DSC 2 and color printer 3 have completed their USB enumeration & configuration procedure, the digitized image data stored in the DSC 2 can be selected and edited and then be transmitted to the adaptor 1 via the USB cable 4 in USB Bulk_IN mode. The digitized image data transmitted from the DSC 2 are temporarily stored in the bi-directional 64-byte Bulk_IN/Bulk_OUT data transfer FIFO bank 255 in the FIFO data bank 25, then transmitted to the USB printer port 15, and finally transmitted to the USB printer 3 via the USB cable 5, in USB Bulk_OUT mode, for printout.

According to the present invention, the digitized image data transmits in Bulk_IN/Bulk_OUT mode, without having to be stored in an external memory device first, thus lowering the material cost of the adapting device; furthermore, it can reduce the system latency time, so the digitized image data can be transmitted to the printer 3 for printouts in the shortest time.

Furthermore, when the DSC 2 and the color printer 3 send out separate system service requests or other particular service requests to the adaptor 1, the Uni-directional 8-byte interrupt transfer FIFO bank 253 & 254 will be responsible for receiving and temporarily storing these requests.

Finally, the adaptor 1 of the present invention is capable of processing digitized image data stored in the removable DSC flash memory card 13. Accordingly, these image data in the flash memory card 13 are read via the DMA controller 27, transmitted to the bi-directional 64-byte Bulk_IN/Bulk_OUT transfer FIFO bank 255 of the FIFO data bank 25, and finally transmitted to color printer 3 for printout.

In conclusion, the adapting device of the present invention for connection between a DSC and a color printer requires only that both the DSC and the color printer are USB-based to be able to transmit digitized image data from a DSC, after being selected and edited, to a color printer for printing directly, skipping a rather expensive personal computer system. In addition, even in the case when only the color printer is USB-based, the adaptor is capable of reading the digitized image data store in the DSC flash memory card and then outputting to the USB color printer for printing.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined by the appended claims and their equivalents.

What is claimed is:

1. An adaptor for connecting between a digital still camera and a printer, comprising:
   a transfer controller connected to a data bank, said transfer controller receiving and storing image data from said digital still camera into said data bank, then transferring said image data to said printer, wherein said data bank comprises a bi-directional data transfer bank, two bi-directional control transfer banks and two uni-directional interrupt transfer banks;
   a memory having a system program; and
   a multi-processing micro-controller connected to said transfer controller and said memory through a data bus and a control bus, said multi-processing micro-controller controlling said transfer controller in receiving and transferring said image data concurrently in response to said system program.

2. The adaptor as claimed in claim 1, wherein said data bank is a dual-port memory device.

3. The adaptor as claimed in claim 1, wherein said transfer controller further comprises a USB serial interface engine which converts said image data received from said digital still camera into parallel data and converts said parallel data into serial data for said printer.

4. The adaptor as claimed in claim 3, wherein said transfer controller further comprises a multi-processing micro-controller interface connected between said USB serial interface engine and said multi-processing micro-controller.

5. The adaptor as claimed in claim 4, wherein the adaptor comprises a removable memory card which stores other image data to be processed by said transfer controller.

6. The adaptor as claimed in claims 5, wherein said transfer controller further comprises a DMA controller connected between said multi-processing micro-controller interface and said control bus to control said removable memory card.

7. The adaptor as claimed in claimed 3, wherein said transfer controller further comprises:
   a first USB transceiver connected between said USB serial interface engine and said digital still camera; and
   a second USB transceiver connected between said USB serial interface engine and said printer.

8. The adaptor as claimed in claim 3, wherein said transfer controller further comprises a USB state controller and a list processor, both being connected to said USB serial interface engine.

9. An adaptor for connecting between a digital still camera and a printer, comprising:
   a transfer controller connected to a bi-directional data transfer bank, said transfer controller receiving and storing image data from said digital still camera into said bi-directional data transfer bank, then transferring said image data to said printer;
   a memory having a system program; and
   a multi-processing micro-controller connected to said transfer controller and said memory through a data bus and a control bus, said multi-processing micro-controller controlling said transfer controller in receiving and transferring said image data concurrently in response to said system program;
   wherein said transfer controller comprises:
      a USB serial interface engine to convert said image data received from said digital still camera into parallel data and convert said parallel data into serial data for said printer; and
      a multi-processing micro-controller interface connected between said USB serial interface engine and said multi-processing micro-controller.

10. The adaptor as claimed in claim 9, wherein said data bank is a dual-port memory device.

11. The adaptor as claimed in claim 9, wherein the adaptor comprises a removable memory card which stores other image data to be processed by said transfer controller.

12. The adaptor as claimed in claim 11, wherein said transfer controller further comprises a DMA controller connected between said multi-processing micro-controller interface and said control bus to control said removable memory card.

13. The adaptor as claimed in claim 11, wherein said transfer controller further comprises:
   a first USB transceiver connected between said USB serial interface engine and said digital still camera; and
   a second USB transceiver connected between said USB serial interface engine and said printer.

14. The adaptor as claimed in claim 11, wherein said transfer controller further comprises a USB state controller and a list processor, both being connected to said USB serial interface engine.

* * * * *